(12) United States Patent
Sato et al.

(10) Patent No.: US 10,427,690 B2
(45) Date of Patent: Oct. 1, 2019

(54) CONTROL SYSTEM

(71) Applicant: TOYOTA JIDOSHA KABUSHIKI KAISHA, Toyota-shi, Aichi-ken (JP)

(72) Inventors: Jun Sato, Susono (JP); Kenichiroh Hara, Yokohama (JP); Junya Kasugai, Kakamigahara (JP); Koichiro Yamauchi, Shizuoka-ken (JP); Kazuhiro Tomosue, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/180,099

(22) Filed: Nov. 5, 2018

(65) Prior Publication Data

US 2019/0135294 A1 May 9, 2019

(30) Foreign Application Priority Data

Nov. 7, 2017 (JP) ................................. 2017-214631

(51) Int. Cl.
| | | |
|---|---|---|
| *B60W 40/08* | (2012.01) | |
| *G06K 9/00* | (2006.01) | |
| *G06K 9/32* | (2006.01) | |
| *G05D 1/00* | (2006.01) | |

(52) U.S. Cl.
CPC ........... *B60W 40/08* (2013.01); *G05D 1/0061* (2013.01); *G05D 1/0088* (2013.01); *G06K 9/00255* (2013.01); *G06K 9/00288* (2013.01); *G06K 9/00308* (2013.01); *G06K 9/00845* (2013.01); *G06K 9/3275* (2013.01); *B60W 2040/0827* (2013.01); *G05D 2201/0213* (2013.01)

(58) Field of Classification Search
CPC .......... B60W 40/08; B60W 2040/0827; G05D 1/0061; G05D 1/0088; G05D 2201/0213; G06K 9/00255; G06K 9/00288; G06K 9/00308; G06K 9/00845; G06K 9/3275
USPC ........ 340/575, 576, 573.1, 573.7, 937, 425.5
See application file for complete search history.

(56) References Cited

U.S. PATENT DOCUMENTS

| | | | | |
|---|---|---|---|---|
| 2012/0154441 A1* | 6/2012 | Kim | ................... | G06K 9/00832 345/633 |
| 2018/0056865 A1* | 3/2018 | Muralidharan | .... | G06K 9/00805 |
| 2018/0314092 A1* | 11/2018 | Todd | ....................... | G06F 3/013 |
| 2018/0357494 A1* | 12/2018 | Herbst | ............... | G06K 9/00845 |

FOREIGN PATENT DOCUMENTS

JP 2012-218592 A 11/2012

\* cited by examiner

*Primary Examiner* — Daryl C Pope
(74) *Attorney, Agent, or Firm* — Sughrue Mion, PLLC (57) ABSTRACT

A control system comprises a driver condition monitoring part configured to monitor the condition of the driver based on the captured image of the driver monitor camera. The driver condition monitoring part is configured to judge if the face of the driver fits in the angle of view of the driver monitor camera based on captured image of the driver monitor camera and to provide the driver through the information providing system with movement information relating to movement necessary for fitting the face of the driver in the angle of view when it is judged that the face of the driver does not fit in the angle of view of the driver monitor camera.

5 Claims, 6 Drawing Sheets

CONTROL SYSTEM

CROSS-REFERENCE TO RELATED APPLICATION

This application claims priority based on Japanese Patent Application No. 2017-214631 filed with the Japan Patent Office on Nov. 7, 2017, the entire contents of which are incorporated into the present specification by reference.

FIELD

The present disclosure relates to a control system for a vehicle.

BACKGROUND

Japanese Unexamined Patent Publication No. 2012-218592 discloses a conventional control system of a vehicle configured so as to judge whether a condition of a driver is a condition suitable for driving based on an eye closure rate of a driver measured by a driver monitor camera.

SUMMARY

However, if using a driver monitor camera for facial recognition of the driver, depending on the posture or physical build of the driver, part of the face of the driver is liable to be unable to fit in the angle of view of the driver monitor camera and the accuracy of facial recognition of the driver is liable to fall.

The present disclosure was made focusing on such problems and has as its object to suppress the drop in accuracy of facial recognition of the driver.

To solve the above problem, according to one aspect of the present disclosure, there is provided a control system for controlling a host vehicle provided with a driver monitor camera configured to capture a face of a driver of the host vehicle and an information providing system configured to provide information to the driver of the host vehicle, which control system comprises a driver condition monitoring part configured to monitor a condition of the driver based on a captured image of the driver monitor camera. The driver condition monitoring part is configured to judge if the face of the driver fits in the angle of view of the driver monitor camera based on a captured image of the driver monitor camera and to provide the driver through the information providing system with movement information relating to movement necessary for fitting the face of the driver in the angle of view when judging that the face of the driver does not fit in the angle of view of the driver monitor camera.

According to this aspect of the present disclosure, it is possible to suppress a drop in accuracy of facial recognition of the driver.

DESCRIPTION OF EMBODIMENTS

Below, referring to the drawings, embodiments of the present invention will be explained in detail. Note that, in the following explanation, similar component elements will be assigned the same reference notations.

First Embodiment

Figure 1:
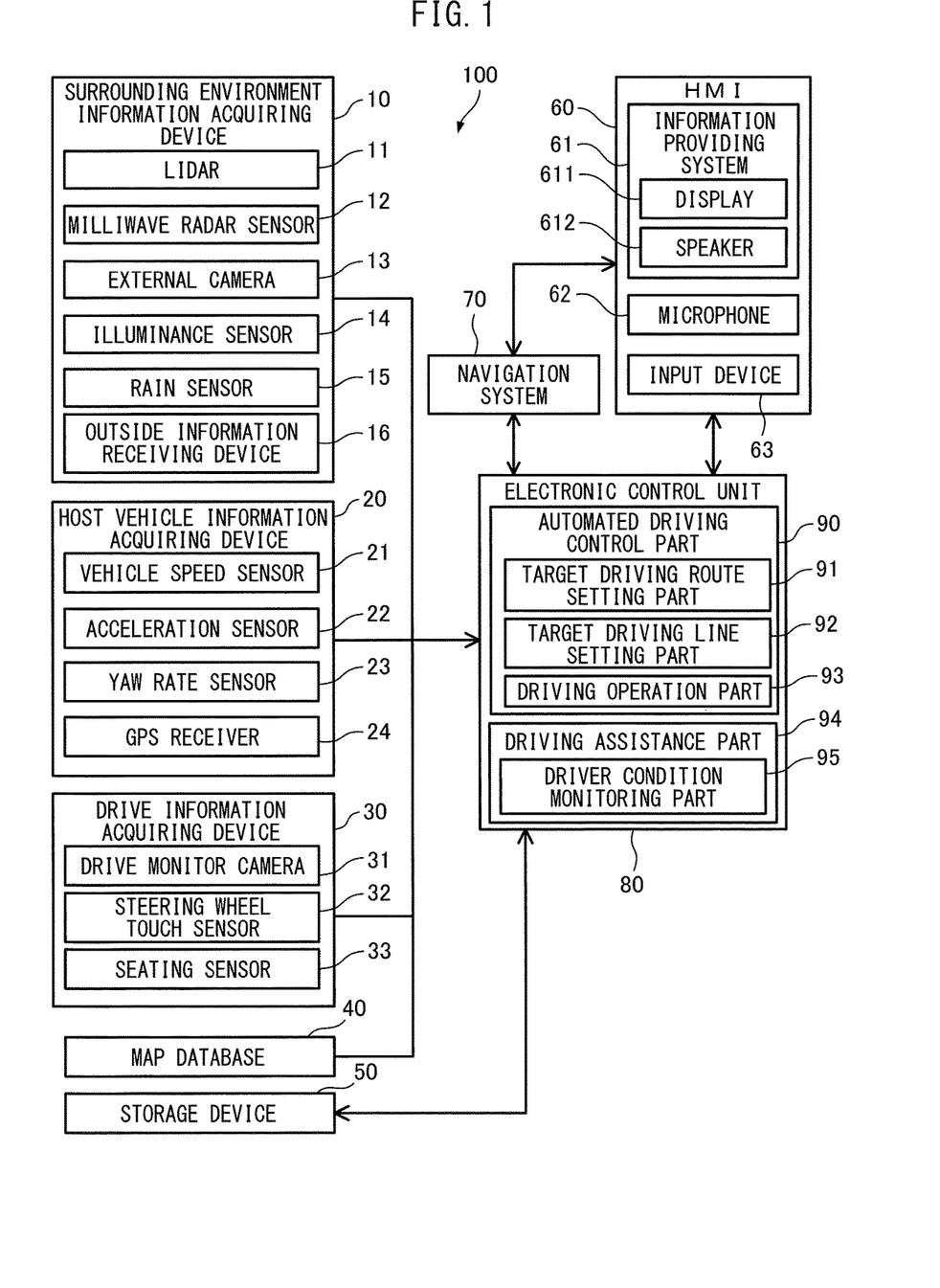
FIG. 1 is a schematic view of the configuration of an automated driving system for a vehicle according to a first embodiment of the present disclosure.
Figure 2:
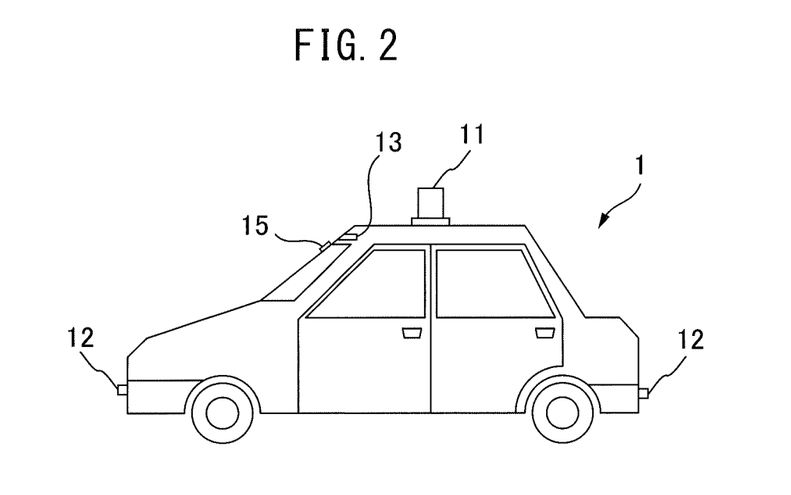
FIG. 2 is a schematic view of the appearance of a host vehicle mounting an automated driving system according to the first embodiment of the present disclosure.
Figure 3:
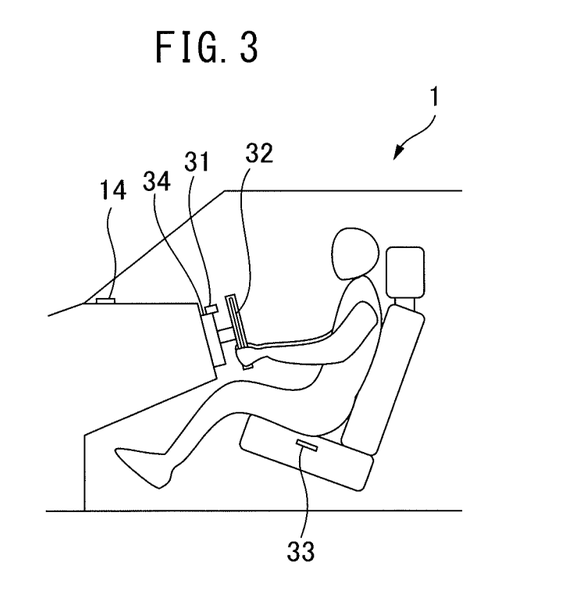
FIG. 3 is a schematic view of the inside of a host vehicle mounting an automated driving system according to the first embodiment of the present disclosure.

FIG. 1 is a schematic view of the configuration of an automated driving system 100 for a vehicle according to a first embodiment of the present disclosure. FIG. 2 is a schematic view of the appearance of a host vehicle 1 mounting an automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

Note that, the locations of attachment and number of the LIDAR device 11 are not particularly limited so long as information required for generating a three-dimensional image can be acquired. For example, the device may also be attached split to the grilles or to the insides of lights such as the headlights or brake lights of the host vehicle 1 or may be attached split to parts of the body (frame) of the host vehicle 1.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment and number of the milliwave radar sensors 12 are not particularly limited so long as the necessary host vehicle surrounding information can be acquired. For example, they may also be attached to the grilles or to the insides of the lights such as the headlights or brake lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the locations of attachment and number of the external cameras 13 are not particularly limited so long able to capture an image of the area in front of the host vehicle 1. For example, the camera may also be attached to the top of the center part of the back surface of the front glass of the host vehicle.

The illuminance sensor 14 detects the illuminance in the host vehicle surroundings. As shown in FIG. 2, in the present embodiment, the illuminance sensor 14 is, for example, attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring system 30 is a system for acquiring information relating to the condition of the driver of the host vehicle 1 (below, referred to as the "driver information"). As shown in FIG. 1 and FIG. 3, the driver information acquiring system 30 according to the present embodiment is comprised of a driver monitor camera 31, steering wheel touch sensor 32, and seating sensor 33.

The driver monitor camera 31 is attached to the top surface of the steering column 34 and captures the appearance of the driver. By image processing of the image of the drive captured, the driver monitor camera 31 detects the driver appearance information such as the expression or posture of the driver. Further, the driver monitor camera 31 sends the detected driver appearance information to the electronic control unit 80.

The steering column 34 is provided with a power tilt/telescopic mechanism enabling an up-down position (angle) and a front-back position (length) of the steering column 34 to be adjusted to any position. Using this power tilt/telescopic mechanism, it becomes possible to automatically change the image capturing position of the driver monitor camera 31 attached to the top surface of the steering column 34.

The steering wheel touch sensor 32 is attached to the steering wheel. The steering wheel touch sensor 32 detects whether the driver is gripping the steering wheel and sends the detected information on the gripping of the steering wheel to the electronic control unit 80.

The seating sensor 33 is provided at the bottom of the surface of the seat. The seating sensor 33 detects the body weight or physical build (sitting height or body length) etc. of the driver based on the load applied to the surface of the seat and sends the input information from the detected seat to the electronic control unit 80.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a vehicle passenger and the automated driving system 100. The HMI 60 according to the present embodiment is provided with an information providing system 61 for providing various information to the driver, a microphone 62 for recognizing the voice of the driver, and a touch panel, operating buttons, or other input device 63 for the driver to perform input operations.

The information providing system 61 is provided with a display 611 for displaying text information or graphic information and a speaker 612 for generating a sound.

The navigation system 70 is an apparatus for guiding the host vehicle 1 to a destination set by the driver through the HMI 60. The navigation system 70 sets the driving route to the destination based on the current position information of the host vehicle 1 detected by the GPS receiver 24 and map information of the map database 40 and transmits the information relating to the set driving route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 90. It is configured so that when the driver switches from the manual driving mode (mode where driver performs driving operations relating to acceleration, steering, and braking) to the automated driving mode, it is possible to automatically perform driving operations relating to acceleration, steering, and braking for driving the vehicle, that is, to perform automated driving. Specifically, the automated driving control part 90 is configured provided with a target driving route setting part 91, target driving line setting part 92, and driving operation implementing part 93.

The target driving route setting part 91 sets the target driving route of the vehicle during the automated driving mode. Specifically, the target driving route setting part 91 sets the driving route up to the destination included in the navigation information as the target driving route.

The target driving line setting part 92 sets the target driving line when driving on a driving lane on the target driving route. Specifically, the target driving line setting part 92 sets as the target driving line a driving line enabling running over the road in front of the host vehicle by a suitable speed corresponding to the road conditions (degree of congestion, road shape, road surface conditions, etc.) based on obstacle information of the surroundings of the host vehicle (information on vehicles in the front, fallen objects, etc.) and road information in front of the host vehicle such as the widths of driving lanes and road shape, and speed information of the host vehicle.

The driving operation part 93 automatically performs driving operations relating to acceleration, steering, and braking so that the vehicle drives along the target driving line. Specifically, the driving operation part 93 controls the various control parts required for performing driving operations relating to acceleration, steering, and braking based on surrounding environment information, host vehicle information, and, in accordance with need, driver information and other various types of information so as to automatically perform driving operations of the vehicle.

Further, the electronic control unit 80 is provided with a driving assistance part 94 in addition to an automated driving control part 90 and is configured to be able to automatically perform various types of driving assistance aimed at securing driver safety during the manual driving mode and automated driving mode.

The driving assistance part 94 according to the present embodiment is provided with a driver condition monitoring part 95 for monitoring the condition of the driver based on the image of the driver captured by the driver monitor camera 31, that is, the above-mentioned driver appearance information, so as to perform such driving assistance. For example, it is configured to prompt attention when the driver is engaged in distracted driving and being lax in monitoring the surroundings and otherwise provide suitable driving assistance corresponding to the driver condition.

Specifically, the driver condition monitoring part 95 performs facial recognition of the driver based on the positions of the two eyes, the position of the nose, the interval between the two eyes, etc. of the driver included in the driver appearance information and monitors the orientation of the face of the driver, the direction of the line of sight, etc.

However, depending on the posture or physical build of the driver, part of the face of the driver ends up deviating without fitting in the angle of view of the driver monitor camera 31 and the accuracy of recognition of the face of the driver is liable to fall. This being so, for example, the driver ends up being prompted to pay more attention regardless of not engaging in distracted driving etc. and otherwise it is liable to become impossible for suitable driving assistance to be provided. Further, if the accuracy of facial recognition of the driver remarkably falls and the face of the driver can no longer be normally recognized, it is liable to be no longer possible to monitor the driver condition. Furthermore, in a situation where the accuracy of recognition of the face of the driver falls and the condition of the driver cannot be sufficiently monitored, from the viewpoint of securing the safety of the driver, it is preferable to avoid as much as possible automated driving from being performed unless some countermeasures are taken.

Therefore, in the present embodiment, the driver condition monitoring part 95 was configured so that when part of the face of the driver does not fit in the angle of view of the driver monitor camera 31, the driver can be notified by text or voice of the information for prompting movement necessary for fitting the face of the driver in the angle of view.

Further, the automated driving control part 90 was configured so that when the face of the driver does not fit in the angle of view of the driver monitor camera 31, from the viewpoint of securing the safety of the driver, it is possible to perform automated driving so long as the driver is gripping the steering wheel. Below, the driver condition monitoring control and automated driving control according to the present embodiment will be explained.

Figure 4:
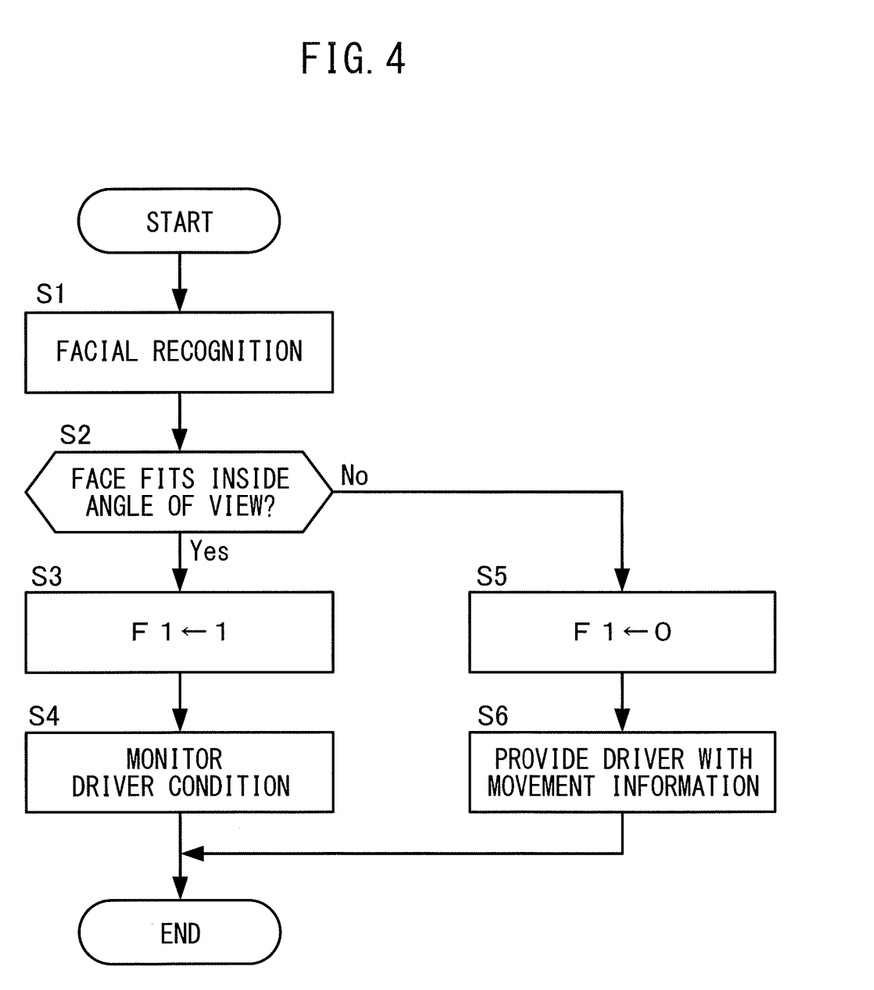
FIG. 4 is a flow chart explaining driver monitoring control according to the first embodiment of the present disclosure.

FIG. 4 is a flow chart for explaining driver monitoring control according to the present embodiment. The electronic control unit 80 repeatedly performs the present routine by a predetermined processing period during operation of the vehicle.

At step S1, the electronic control unit 80 performs facial recognition of the driver based on the positions of the two eyes, the position of the nose, the interval between the two eyes, etc. of the driver included in the driver appearance information.

At step S2, the electronic control unit 80 judges if the face of the driver fits in the angle of view of the driver monitor camera 31 based on the results of facial recognition of the driver. For example, the electronic control unit 80 judges that the face of the driver does not fit in the angle of view of the driver monitor camera 31 if part of the face deviates etc. as a result of facial recognition of the driver. The electronic control unit 80 proceeds to the processing of step S3 if the face of the driver fits in the angle of view of the driver monitor camera 31. On the other hand, the electronic control unit 80 proceeds to the processing of step S5 if the face of the driver does not fit in the angle of view of the driver monitor camera 31.

At step S3, the electronic control unit 80 sets the flag F1 at "1". The flag F1 is a flag which is set to "1" when the face of the driver fits in the angle of view of the driver monitor camera 31 and is set to "0" when the face of the driver is not in the angle of view of the driver monitor camera 31. The initial value of the flag F1 is set to "0".

At step S4, the electronic control unit 80 detects the orientation of the face of the driver, the direction of the line of sight, etc. based on the results of facial recognition of the driver to monitor the driver condition.

At step S5, the electronic control unit 80 sets the flag F1 to "0".

At step S6, the electronic control unit 80 provides the driver with information for prompting movement necessary for making the face of the driver fit in the angle of view (below, referred to as "movement information") through the information providing system 61.

The movement information is text information or voice information of content such as "correct your posture" and "change the position of your face". By providing such movement information through the information providing system 61 to the driver, it is possible to prompt the driver to perform movement required for making the face of the driver fit in the angle of view of the driver monitor camera 31.

Note that the content of the movement information may be changed according to the deviated part of the face of the driver deviating from the inside of the angle of view of the driver monitor camera 31. For example, if the eyes of the driver deviate, the content of the movement information may be changed to information of the content "Your eyes are off. Please lower the position of your face". Due to this, it is possible to prompt the driver to perform suitable movement corresponding to the deviating part of the face as movement for fitting the face of the driver inside the angle of view of the driver monitor camera 31.

Further, the content of the movement information may be changed according to the degree of deviation of the face of the driver deviating from the inside of the angle of view of the driver monitor camera 31. For example, if the face of the driver deviates upward, it is also possible to change the content of the movement information corresponding to the amount of deviation [cm] from the center of the angle of view to information of the content of "Please lower the position of your face by several centimeters". Due to this, it is possible to prompt the driver to perform suitable movement corresponding to the degree of deviation of the face as movement for fitting the face of the driver inside the angle of view of the driver monitor camera 31.

Figure 5:
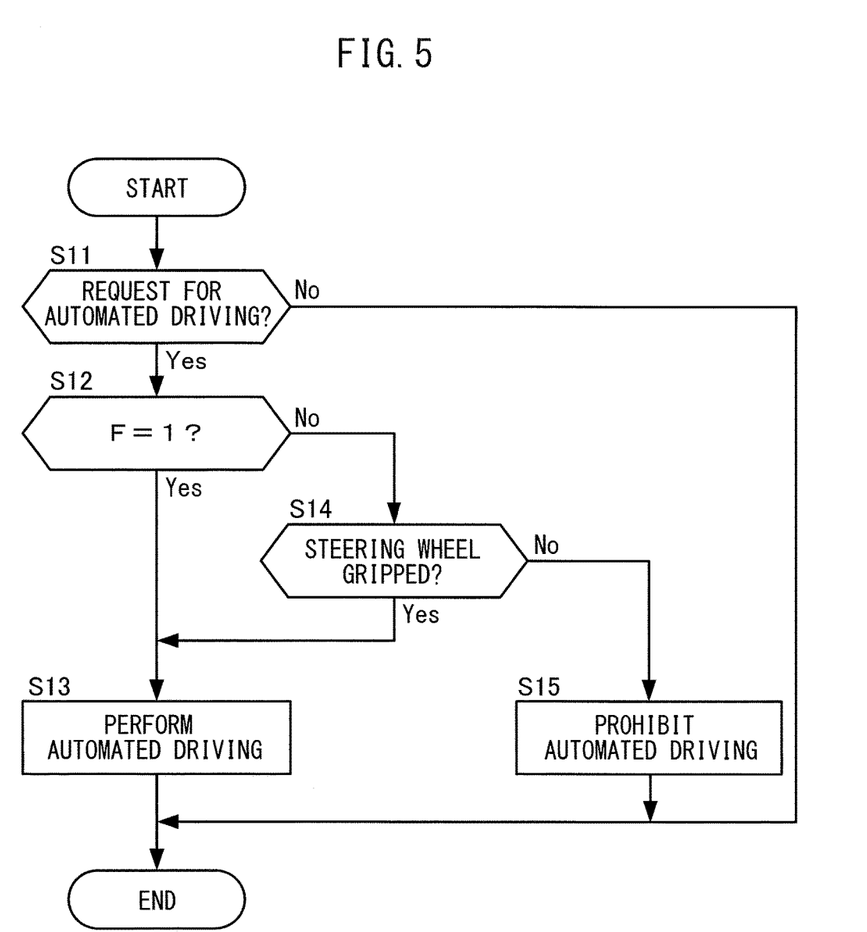
FIG. 5 is a flow chart explaining automated driving control according to the first embodiment of the present disclosure.

FIG. 5 is a flow chart for explaining automated driving control according to the present embodiment. The electronic control unit 80 repeatedly performs the present routine during operation of the vehicle by a predetermined processing period.

At step S11, the electronic control unit 80 judges if there is a request for automated driving. Specifically, the electronic control unit 80 judges if the operating mode is being switched to the automated driving mode. The electronic control unit 80 judges that there is a request for automated driving if the driving mode has been switched to the automated driving mode and then proceeds to the processing of step S12. On the other hand, the electronic control unit 80 judges that there is no request for automated driving and ends the current processing if the driving mode is the manual driving mode.

At step S12, the electronic control unit 80 reads the value of the flag F1 which is set and updated at any time in driver monitoring control and judges if the value of the flag F1 is "1" or not. That is, the electronic control unit 80 judges if the face of the driver fits in the angle of view of the driver monitor camera 31 and the situation is one where the condition of the driver can be sufficiently monitored. The electronic control unit 80 judges that the condition of the driver can be sufficiently monitored if the value of the flag F1 is "1" then proceeds to the processing of step S13. On the other hand, the electronic control unit 80 judges that the condition of the driver cannot be sufficiently monitored if the value of the flag F1 is "0" then proceeds to the processing of step S14.

At step S13, the electronic control unit 80 permits automated driving and performs automated driving.

At step S14, the electronic control unit 80 judges whether the driver is gripping the steering wheel based on the gripping information of the steering wheel. The electronic control unit 80 judges that the minimum extent of safety can be secured when performing automated driving even if the driver condition cannot be sufficiently monitored and proceeds to the processing of step S13 if the driver is gripping the steering wheel. On the other hand, the electronic control unit 80 proceeds to the processing of step S15 if the driver is not gripping the steering wheel.

At step S15, the electronic control unit 80 prohibits automated driving. Specifically, the electronic control unit 80 holds off on starting automated driving until the face of the driver fits inside the angle of view of the driver monitor camera 31 or until the driver grips the steering wheel if the time when the start of automated driving is requested. Further, if during automated driving, the driver is for example requested to change the driving operation through the information providing system 61 so as to suspend automated driving until the face of the driver fits inside the angle of view of the driver monitor camera 31 or until the driver grips the steering wheel.

According to the present embodiment explained above, the electronic control unit 80 (control system) for control of a vehicle provided with a driver monitor camera 31 configured to capture an image of the face of the driver of the host vehicle and an information providing system 61 configured to provide information to the driver of the host vehicle is provided with a driver condition monitoring part 95 for monitoring the condition of the driver based on the captured image of the driver monitor camera 31.

Further, the driver condition monitoring part 95 is configured to judge if the face of the driver fits in the angle of view of the driver monitor camera 31 based on the captured image of the driver monitor camera 31 and, when it is judged that the face of the driver does not fit in the angle of view of the driver monitor camera 31, to provide movement information through the information providing system 61 to the driver regarding movement required for making the face of the driver fit inside the angle of view.

Due to this, the driver can be prompted to perform movement required for fitting the face of the driver in the angle of view of the driver monitor camera 31, so it is possible to keep the accuracy of facial recognition of the driver from falling.

At this time, if configuring the driver condition monitoring part 95 so as to change the content of the movement information provided to the driver corresponding to the deviated part of the face of the driver deviating from inside the angle of view of the driver monitor camera 31, it is possible to prompt the driver to perform suitable movement corresponding to the deviated part of the face as movement for fitting the face of the driver in the angle of view of the driver monitor camera 31. For this reason, it is possible to effectively suppress a drop in accuracy of facial recognition of the driver.

Further, if configuring the driver condition monitoring part 95 so as to change the content of the movement information provided to the driver in accordance with the degree of deviation of the face of the driver from inside the angle of view of the driver monitor camera 31, it is possible to prompt the driver to perform suitable movement corresponding to the degree of deviation of the face as movement for fitting the face of the driver in the angle of view of the driver monitor camera 31. For this reason, it is possible to effectively suppress a drop in the accuracy of facial recognition of the driver.

Further, the electronic control unit 80 (control device) according to the present embodiment is further provided with an automated driving control part 90 configured to perform automated driving for automatically performing driving operations of the vehicle. The automated driving control part 90 is configured to judge if the driver is gripping the steering wheel based on input information from the driver at the steering wheel of the vehicle and, if it is judged that the face of the driver does not fit in the angle of view of the driver monitor camera 31, to permit automated driving so long as the driver is gripping the steering wheel.

Due to this, even under conditions where the accuracy of facial recognition of the driver falls, automated driving can be performed in a state securing safety.

Second Embodiment

Next, a second embodiment of the present disclosure will be explained. The present embodiment differs from the first embodiment on the point of automatically adjusting the image capturing position of the driver monitor camera 31 to a suitable position corresponding to the physical build of the driver when starting to monitor the driver condition. Below, this point of difference will be mainly explained.

If the steering column is provided with a power tilt/telescopic mechanism etc., it is possible to automatically change the image capturing position of the driver monitor camera 31 attached to the top surface of the steering column.

For this reason, for example, when starting the vehicle, when starting automated driving, and when otherwise starting monitoring the driver condition, if possible to automatically adjust the image capturing position of the driver monitor camera 31 to a suitable position in accordance with the physical build of the driver, it is possible to lower the probability of the face of the driver no longer fitting in the angle of view of the driver monitor camera 31 and in turn possible to suppress a drop in accuracy of facial recognition.

Therefore, in the present embodiment, when starting to monitor the driver condition, it is made possible to adjust the image capturing position of the driver monitor camera 31 to a suitable position corresponding to the physical build of the driver.

Figure 6:
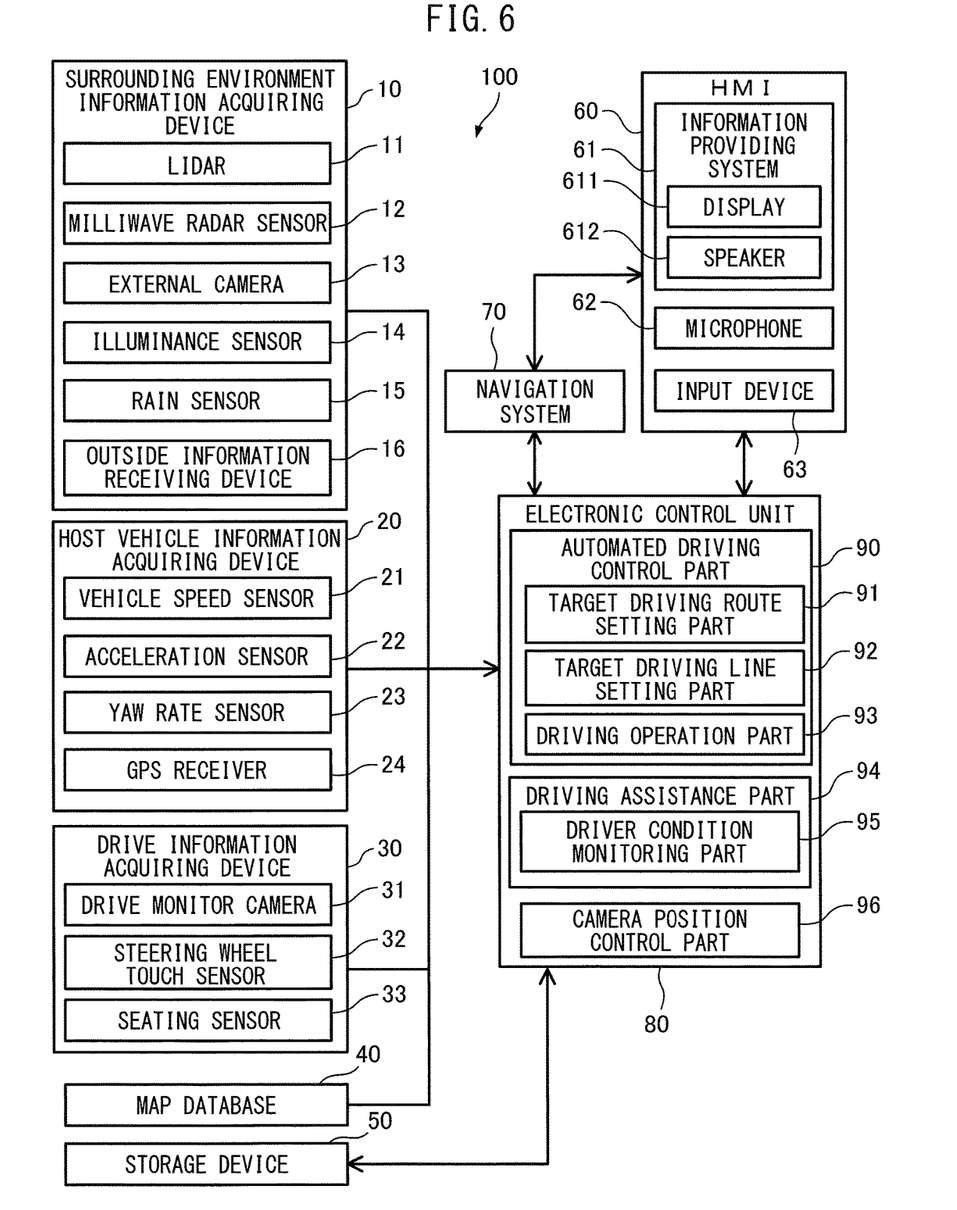
FIG. 6 is a schematic view of the configuration of an automated driving system for a vehicle according to a second embodiment of the present disclosure.

FIG. 6 is a schematic view of the configuration of an automated driving system 100 for a vehicle according to a second embodiment of the present disclosure.

As shown in FIG. 6, the electronic control unit 80 according to the present embodiment further comprises a camera position control part 96. The camera position control part 96 adjusts the image capturing position of the driver monitor camera 31 to a suitable position according to the physical build of the driver when starting to monitor the driver condition. Below, the camera position control according to the present embodiment will be explained.

Figure 7:
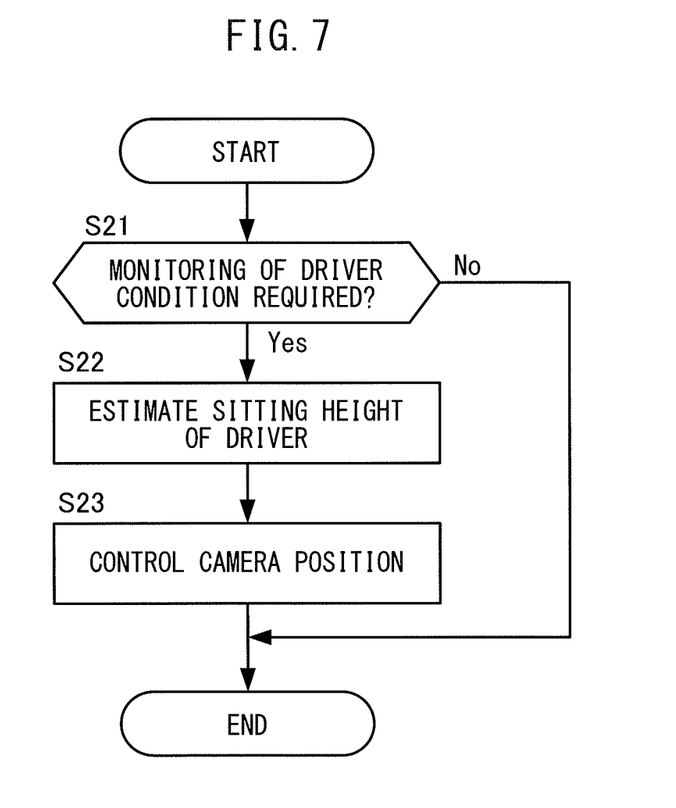
FIG. 7 is a flow chart explaining camera position control according to the second embodiment of the present disclosure.

FIG. 7 is a flow chart for explaining camera position control according to the present embodiment.

At step S21, the electronic control unit 80 judges if it is the time for starting monitoring of the driver condition. In the present embodiment, the electronic control unit 80 judges if it is time to start the vehicle, but the timing of judgment is not limited to this. For example, it may also be the time for start of automated driving. Further, if able to turn ON/OFF monitoring of the driver condition at the intent of the driver, it may also be the time when the driver turns the monitoring of the driver condition ON.

At step S22, the electronic control unit 80 estimates the sitting height of the driver based on the input information from the seat detected by the seating sensor 33.

At step S23, the electronic control unit 80 sets the target initial position of the driver monitor camera 31 based on the sitting height of the driver and controls the power tilt/telescopic mechanism of the steering column so as to reach that target initial position. Note that in the present embodiment, the average positional relationship between the sitting height of the driver and the face is found in advance by experiments etc. By referring to a map summarizing these relationships, the target initial position of the driver monitor camera 31 is set based on the sitting height of the driver.

The electronic control unit 80 according to the present embodiment explained above further comprises a camera position control part 96 configured to control a power tilt/telescopic mechanism (camera position adjustment mechanism) for automatically adjusting the position of the driver monitor camera 31. The camera position control part 96 is configured to estimate the sitting height of the driver based on the input information from the seat on which the driver sits, set the target initial position of the driver monitor camera 31 based on that sitting height, and control the power tilt/telescopic mechanism so as to become that target initial position.

By automatically adjusting the initial position of the driver monitor camera 31 based on the sitting height of the driver in this way, it is possible to lower the probability of the face of the driver no longer fitting in the angle of view of the driver monitor camera 31. For this reason, it is possible to suppress a drop in accuracy of facial recognition of the driver.

Above, embodiments of the present disclosure were explained, but the above embodiments only show part of the examples of application of the present disclosure. They are not intended to limit the technical scope of the present disclosure to the specific constitutions of the embodiments.

The invention claimed is:

1. A control system for controlling a host vehicle, the host vehicle comprising:
   a driver monitor camera configured to capture a face of a driver of the host vehicle; and
   an information providing system configured to provide information to the driver of the host vehicle, wherein
   the control system comprises a driver condition monitoring part configured to monitor a condition of the driver based on a captured image of the driver monitor camera, and
   the driver condition monitoring part is configured
      to judge if the face of the driver fits in an angle of view of the driver monitor camera based on the captured image of the driver monitor camera and
      to provide the driver through the information providing system with movement information relating to movement necessary for fitting the face of the driver in the angle of view when judging that the face of the driver does not fit in the angle of view of the driver monitor camera.

2. The control system according to claim 1, wherein the control system further comprises an automated driving control part configured to perform automated driving for automatically performing driving operations of the vehicle, and
   the automated driving control part is configured to
      judge if the driver is gripping a steering wheel of the vehicle based on input information from the driver to the steering wheel and
      permit automated driving when it is judged that the face of the driver does not fit in the angle of view only when the driver is gripping the steering wheel.

3. The control system according to claim 1, wherein the driver condition monitoring part is configured so as to change a content of the movement information provided to the driver in accordance with a deviated part of the face of the driver deviating from inside the angle of view of the driver monitor camera.

4. The control system according to claim 1, wherein the driver condition monitoring part is configured so as to change a content of the movement information provided to the driver in accordance with a degree of deviation of the face of the driver from inside the angle of view of the driver monitor camera.

5. The control system according to claim 1, wherein the control system further comprises a camera position control part configured to control a camera position adjustment mechanism for automatically adjusting a position of the driver monitor camera, and
   the camera position control part is configured
      to estimate a sitting height of the driver based on input information from a seat on which the driver is seated and
      to set a target initial position of the driver monitor camera based on the sitting height and controlling the camera position adjustment mechanism so as to become the target initial position.

\* \* \* \* \*